April 24, 1956 — O. HAENTJENS ET AL — 2,743,120
STUFFING BOX
Filed Nov. 1, 1952

INVENTORS
OTTO HAENTJENS
WALTER D. HAENTJENS
BY Oldham & Oldham
ATTORNEYS

INVENTORS
OTTO HAENTJENS
WALTER D. HAENTJENS
BY
Oldham & Oldham
ATTORNEYS

United States Patent Office 2,743,120
Patented Apr. 24, 1956

2,743,120

STUFFING BOX

Otto Haentjens, Hazleton, and Walter D. Haentjens, Sugarloaf, Pa.

Application November 1, 1952, Serial No. 318,294

2 Claims. (Cl. 286—9)

This invention relates to pumps, and particularly to stuffing boxes for rotary liquid pumps.

One special type of material that is transmitted by rotary pumps today is a substance generally called a "heavy density" mixture. Usually this might be some powdered material, such as magnetite which is carried in a water medium. It is desired to keep this pumped substance to a very high density solids content. Obviously, when transmitting solid material through a rotary pump, one must be particularly careful that the solids do not work their way into the stuffing box provided for the pump.

Heretofore it has been proposed to use some type of liquid or mechanical seal means in liquid pumps which means provide a water film at the pump stuffing box and wherein water gradually seeps from an external supply source along the pump shaft into the pump chamber. One of such types of constructions is shown in Patent 450,518, whereas Patent 1,990,519 is another illustration of a seal or stuffing box of this type. Seals like that described have given fairly good service when used with heavy density mixtures but have diluted the mixture objectionably, or have not had the desired degree of control in the pressure set up in the seal means used.

Other constructions have been proposed for sealing pumps of this general type and such prior types of sealing means have, in some instances, included relatively complicated constructions involving springs or small parts and have utilized a centrifugal sealing action in some instances.

When these heavy density substances are being pumped, a flow of clean water into the pump is undesired because of the diluting effect of the added water. Grease also is not acceptable as a sealing medium since the pumped material soon becomes mixed with the grease and scores the shaft sleeve. Other types of special hydraulic seals have not worked out satisfactorily as expellers would be required to overcome the suction head on the pump and they would lose their ability to overcome this head as wear occurs.

The general object of the present invention is to provide a relatively simple but dependable type of a stuffing box particularly adapted for use with pumps handling heavy density substances in a liquid medium or carrier.

Another object of the invention is to provide a stuffing box for a rotary pump, which stuffing box is characterized by the use therein of a floating bushing or neck ring which automatically has the inlet pressure of the pump exerted thereon on an inner seal in the stuffing box.

Another object of the invention is to provide a stuffing box which provides a relatively inexpensive seal for the pump and which has two independent adjustments for controlling the sealing means provided in the stuffing box for engaging axially spaced portions of a pump shaft on opposite sides of a water sealing chamber in the stuffing box.

Further objects of the invention are to provide a stuffing box which operates even when the rotary pump is shut down; to provide a stuffing box that keeps dirt from the pump out of the pump seal means; to provide a liquid seal ring fixedly positioned to the pump housing; and to provide a stuffing box with a fixed pressure water supply so that the water pressure in the seal ring can balance the inlet pressure of the pump.

The foregoing and other objects and advantages of the invention will be made more apparent as the specification proceeds.

For a better understanding of the invention, reference should be had to the accompanying drawing wherein one currently preferred embodiment of the invention is shown and wherein.

Figure 1:
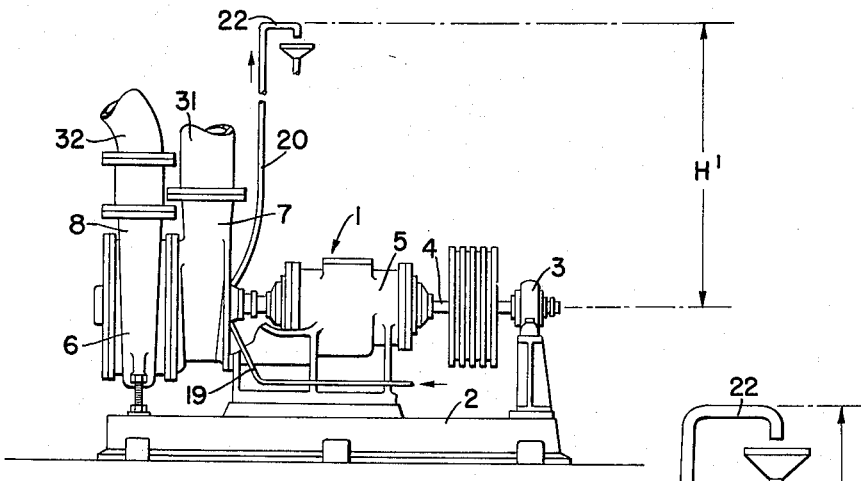
Fig. 1 is an elevation of a pump having the stuffing box of the invention provided therein.

The present invention relates to a pump wherein a pump housing is provided with a shaft extending through a portion of the housing and where a neck ring is slidably engaged with the housing to aid in providing an inner seal in the pump, which neck ring has an inlet end exposed to the inlet pressure of the pump. A water seal ring is secured to the housing and has a bore encompassing the shaft axially outwardly of the neck ring, and means to supply the water seal ring with water under a controllable pressure are provided for flow of water along the shaft to counteract the pressure on the neck ring. Packing means are positioned intemediate the water seal ring and the axially outer end of the neck ring for control of the sealing action thereof by the pump pressure, and independently adjustable sealing means engage the shaft on the axially outer side of the water seal ring to provide the main seal means of the pump.

The details of the improved pump and stuffing box of the invention will best be understood by a study of the accompanying drawing wherein 1 represents the complete pump assembly of the invention. Usually this includes a frame 2 having suitable bearing means 3 at one end of the frame 2 for receiving and positioning a shaft 4 of the pump. This shaft 4 of the pump also extends through a support housing 5 in which additional bearing means (not shown) are positioned for journaling the shaft 4 in the pump assembly.

The actual pump of the invention includes a pump housing 6 which usually has a suction inlet 7 and an outlet 8, as shown. The inlet 7 connects to a collection tank 30 by a pipe 31 (Fig. 3) for the heavy density medium, or substance which usually is pumped by the pump of the invention. Hence, the inlet 7 has a positive pressure set up on the suction or inlet side of the pump. The pump outlet 8 connects by a pipe 32 to a cleaning tank 33 into which a material such as coal 34 is fed. Some of the carrying medium and cleaned product flows from the cleaning tank 33 onto a suitable screen 35 so that the carrier medium and coal 34 may readily be separated. The carrier medium is usually quite dense or filled with small solid particles and is recirculated by the pump of the invention without being diluted in passing through such pump.

A wear-resistant sleeve 9 may be secured around the end of the shaft 4 which extends into the pump housing 6 and such sleeve 9 is in liquid tight relationship to the shaft 4. An impeller 10 of suitable construction is carried by the shaft 4 within the pump housing 6.

As an important feature of the invention, the stuffing box provided for the pump assembly 1 includes a neck ring 11 the axially inner end of which extends through a hole 6ª in the pump housing 6 adjacent the inlet 7. The neck ring 11 is positioned by the inlet 7. Usually a shoulder 12 is provided on the neck ring 11 at the axially outer end thereof and it abuts upon a complementary shoulder provided in the pump inlet 7. Such shoulder 12 prevents the neck ring 11 from protruding into the inlet 7 an undesired amount. However, this neck ring 11 is exposed to and receives the inlet pressure of material in the pump to exert such pressure upon a number of conventional packing rings 13 positioned around the sleeve 4 and abutted against a water or liquid seal ring 14.

As a feature of the invention, the water seal ring 14 is fixedly secured to the pump inlet 7 by conventional means (not shown), such as cap screws, and it usually has a projection 15 provided on an axially inner edge thereof for engaging the hole 6ª to aid in securing the water seal ring to the pump housing 6 in a definite position. The water seal ring 14 has an annular groove 16 provided in its bore and inlet and outlet ports 17 and 18, respectively, connect to such a groove 16. Suitable conduits 19 and 20 connect to these inlet and outlet ports 17 and 18, respectively, so that a constant supply of sealing medium, usually water, can be supplied to the water seal ring under a controllable pressure, as hereinafter explained.

The liquid sealing medium used, usually water, may be forced through the conduit 19 to flow to the seal ring 14. Water exhausting from the recess or groove 16 in the water seal ring passes to a drain tube 22, the vertical position of which is fixed to set the pressure of the water in the seal ring 14 and with the water flowing from the tube 22 into suitable drain means. Thus it is an important feature of the invention that the pressure H' (Fig. 1, 2 or 4) of the water supplied to the water seal ring 14 balances the inlet pressure H (Fig. 3) of the material being pumped in the pump of the invention. Such pressures may be calculated ahead of time by taking into consideration the head of materials involved, the densities of the material being pumped and that of the seal liquid, etc. The seal then maintains a balanced pressure on the neck ring 11 and prevents any of the pumped medium from flowing past the neck ring 11. Likewise, no water will flow into the pump around the neck ring 11 and packing 13. Hence when operating conditions are established, little or no liquid flows through the seal ring 14.

The stuffing box of the invention is then completed by an independently adjustable sealing means. This means includes a plurality of conventional packing rings 23 positioned around the shaft 4 and with such rings 23 being pressed against a portion of the water seal ring by means of a packing gland 24 that is in engagement with an axially extended portion of the water seal ring. It will be realized that the packing rings 13 and neck ring 11 provide the primary seal of the pump and stuffing box of the invention, but that the provision of the conventional packing rings 23 is necessary in order to prevent flow of the sealing liquid to the atmosphere.

The new and improved seal of the invention is of relatively simple construction but has been found to give excellent service life.

It will be realized that the neck ring 11 automatically adjusts its position and the pressure that it exerts on the packing 13 with changes in the inlet pressure in the pump. As the pressure applied to the water in the seal ring 14 remains when the pump is stopped, an effective seal action will be maintained under static conditions.

Figure 2:
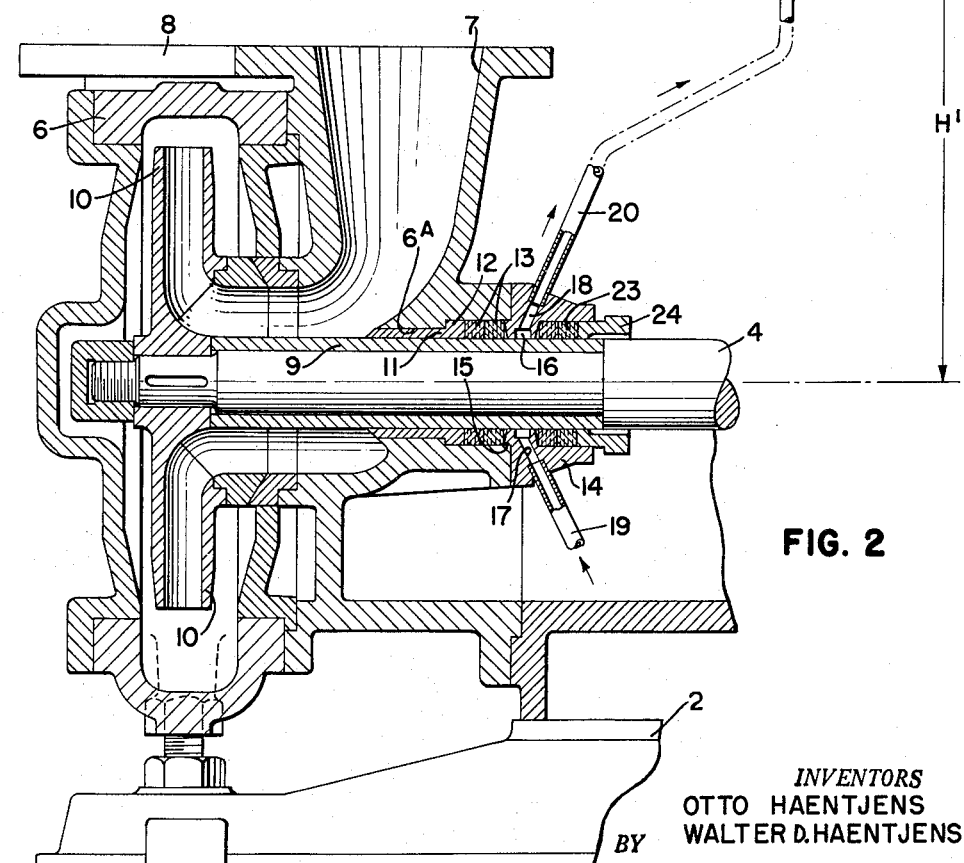
Fig. 2 is a fragmentary enlarged vertical section through the pump and stuffing box.
Figure 3:
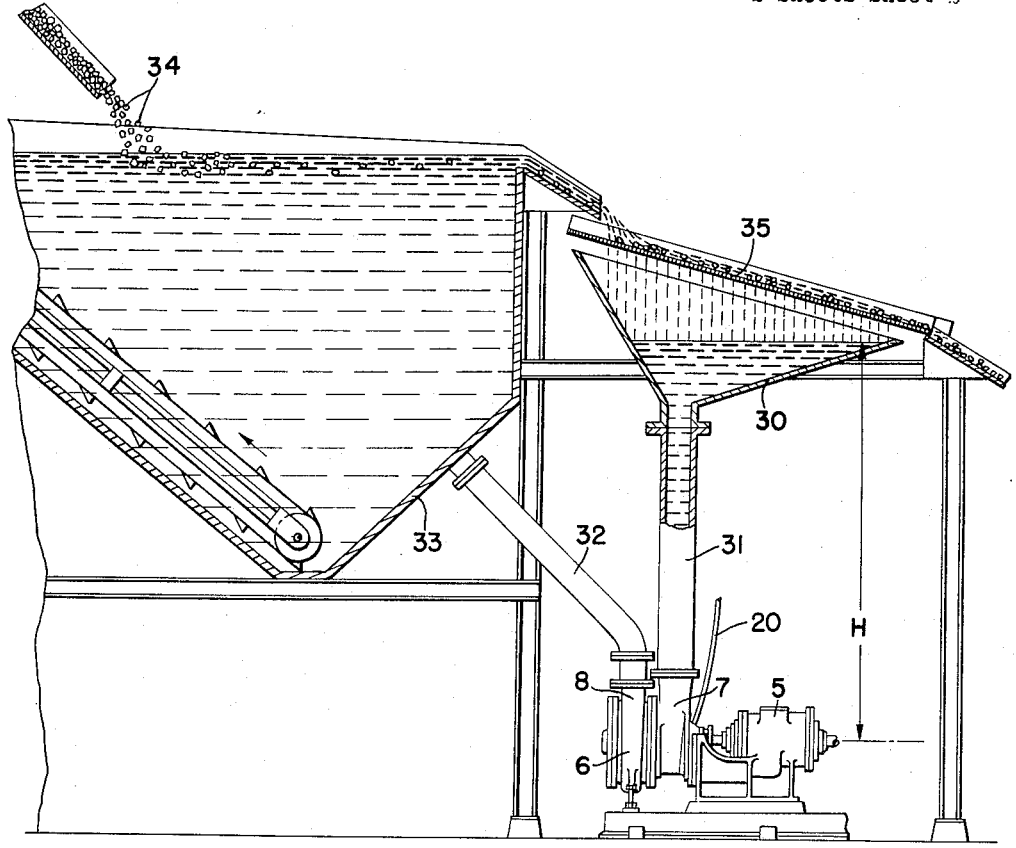
Fig. 3 is an elevation, partly shown in section, of the pump assembly of the invention and the apparatus operatively connected thereto.
Figure 4:
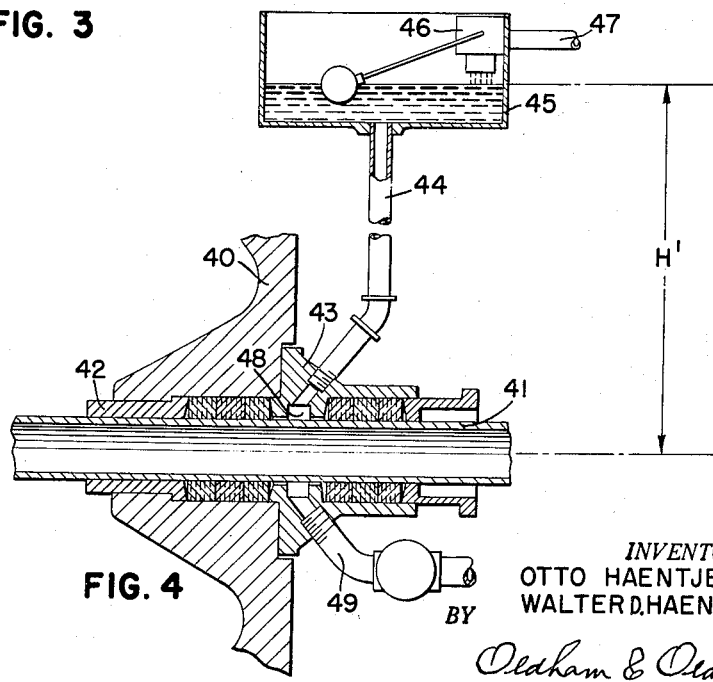
Fig. 4 is a vertical section, partly broken away, of a modified stuffing box of the invention.

Fig. 4 shows a modification of the invention wherein a pump housing 40 is provided and it receives a shaft 41, neck ring 42 and water seal ring 43 like the embodiment of the invention shown in Figs. 1 to 3. As a feature of the seal for the pump, a water inlet conduit 44 connects the seal ring to a water constant head tank 45. Water, or other suitable sealing liquid, is maintained at a uniform level in the tank 45 by a float controlled valve 46 so that the liquid will exert a uniform pressure in the pump at the seal ring 43. The valve 46 connects to a source of water shown as a pipe 47. The position of the tank 45 and water level therein is fixed so that the desired pressure may be set up on liquid in a recess 48 formed in the seal ring and will be retained when the pump is stopped. A drain conduit 49 connects to the water seal ring 43 for use when the seal ring is to be drained.

The operation of the pump and stuffing box are thought to be clear from the description set forth hereinabove, and it is thought that the objects of the invention are clearly achieved by the provision of the construction shown and described hereinbefore. It will be realized that the pressure on the liquid, normally water, in the water seal rings can be varied in both embodiments of the invention only by change in the overflow pipe, or by relocation of the constant head tank so that its pressure usually will be set according to the particular installation.

While several complete embodiments of the invention have been disclosed herein, it will be appreciated that modifications of these particular embodiments of the invention may be resorted to without departing from the scope of the invention as defined by the appended claims.

Having thus described our invention, what we claim is:

1. In a liquid pump, a pump housing, a shaft extending through a portion of said housing, a neck ring slidably engaged with said housing, said neck ring having an inner end exposed to the inlet pressure of liquid in the pump, a water seal ring stationarily secured to said housing and having a bore encompassing said shaft axially outwardly of and spaced from said neck ring, said water seal ring having inlet and outlet ports therein connecting to an annular groove in its bore, means for maintaining a static liquid head pressure on water in said water seal ring connected to said water seal ring, packing means intermediate and abutted against said water seal ring and the axially outer end of said neck ring, packing means engaging said shaft on the axially outer side of said water seal ring and abutted thereagainst, and a stuffing box gland adjustably engaging said water seal ring and said outer packing means for controlling the pressure exerted on said outer packing means.

2. In a pump, as in claim 1, wherein said pressure maintaining means comprises an overflow pipe connected to the outlet of said water seal ring to set up the static pressure head on liquid in the groove therein, and means connected to said water seal ring to supply liquid to the inlet port thereof under pressure.

References Cited in the file of this patent

UNITED STATES PATENTS

| | | |
|---|---|---|
| 450,518 | Mayer | Apr. 14, 1891 |
| 859,329 | McMullen | July 9, 1907 |
| 1,369,379 | Bogdanoff | Feb. 22, 1921 |
| 1,436,881 | Kerr | Nov. 28, 1922 |
| 1,572,922 | Govers et al. | Feb. 16, 1926 |
| 1,874,324 | MacMeeken | Aug. 30, 1932 |
| 1,922,050 | La Bour | Aug. 13, 1933 |
| 1,990,519 | Bigelow et al. | Feb. 12, 1935 |
| 2,281,933 | Gage | May 5, 1942 |
| 2,321,609 | Marco | June 15, 1943 |
| 2,329,373 | Hornschuch | Sept. 14, 1943 |
| 2,368,962 | Blom | Feb. 6, 1945 |

FOREIGN PATENTS

| | | |
|---|---|---|
| 679,502 | Great Britain | Sept. 17, 1952 |